(12) United States Patent
Buck et al.

(10) Patent No.: US 9,122,849 B2
(45) Date of Patent: Sep. 1, 2015

(54) SECURE AUTHENTICATION USING MEMORY CARDS

(75) Inventors: Kenneth J Buck, Webster, NY (US); Timothy L Dioguardi, Rochester, NY (US); Chandra Dasaraju, Hyderabad-16 (IN)

(73) Assignee: XEROX CORPORATION, Norwalk, CT (US)

( * ) Notice: Subject to any disclaimer, the term of this patent is extended or adjusted under 35 U.S.C. 154(b) by 257 days.

(21) Appl. No.: 13/534,118

(22) Filed: Jun. 27, 2012

(65) Prior Publication Data

US 2014/0007177 A1    Jan. 2, 2014

(51) Int. Cl.
   *G06F 21/31*   (2013.01)
   *G06F 21/55*   (2013.01)
   *H04L 29/06*   (2006.01)
   *G06F 21/00*   (2013.01)

(52) U.S. Cl.
   CPC ............. *G06F 21/31* (2013.01); *G06F 21/00* (2013.01); *G06F 21/55* (2013.01); *H04L 63/20* (2013.01)

(58) Field of Classification Search
   None
   See application file for complete search history.

(56) References Cited

U.S. PATENT DOCUMENTS

| | | | |
|---|---|---|---|
| 4,327,353 A * | 4/1982 | Beard et al. ..................... 340/5.3 |
| 5,774,545 A * | 6/1998 | Raghavachari ............... 713/189 |
| 6,292,899 B1 * | 9/2001 | McBride .......................... 726/22 |
| 7,474,428 B2 * | 1/2009 | Morris-Jones et al. ...... 358/1.15 |
| 7,475,812 B1 * | 1/2009 | Novozhenets et al. ........ 235/382 |
| 2009/0070264 A1 * | 3/2009 | Buck et al. ....................... 705/44 |
| 2009/0198618 A1 * | 8/2009 | Chan et al. ....................... 705/66 |
| 2010/0064144 A1 * | 3/2010 | Kaabouch et al. ............. 713/190 |

* cited by examiner

*Primary Examiner* — Saleh Najjar
*Assistant Examiner* — Jason Plotkin
(74) *Attorney, Agent, or Firm* — Jones Robb, PLLC

(57) ABSTRACT

Embodiments of a method are provided for personalizing a memory card. The method comprises receiving one or more credentials. The method further comprises authenticating the one or more credentials. The method further comprises reserving a memory segment in the memory card based on the authentication, wherein one or more memory segments in the memory card are vacant. The method furthermore comprises writing the one or more credentials on to the memory segment.

23 Claims, 7 Drawing Sheets

SECURE AUTHENTICATION USING MEMORY CARDS

TECHNICAL FIELD

The presently disclosed embodiments pertain to an authentication and access grant solution that can be achieved using a memory card.

BACKGROUND

Card-based authentication solutions are expensive in terms of licenses, administration (such as, personnel for monitoring, card issuance, and the like), infrastructure (such as, a third party application, a client middleware, a card management station, and the like), and maintenance (such as, replacing lost cards, issuing new certificates, revocation, and the like). Moreover, a decrease in productivity is observed due to a security mechanisms used by the authentication solutions that consume abundant time for an authentication process. Examples of such security mechanism include Hyper Text Transfer Protocol Secure (HTTPS) with certificate validation, Public Key Infrastructure (PKI), and the like. Consequently, more time is required for a device to authenticate a user that uses a memory card versus the device to authenticate another user who manually inputs their username and password. Therefore, there is a need for an efficient and secure card-based authentication solution.

SUMMARY

According to aspects illustrated herein, a method is provided for personalizing a memory card. In an embodiment, the method involves receiving one or more credentials. The method further comprises authenticating the one or more credentials. The method further comprises reserving a memory segment in the memory card based on the authentication, wherein one or more memory segments in the memory card are vacant. The method furthermore comprises writing the one or more credentials on to the memory segment.

BRIEF DESCRIPTION OF DRAWINGS

The accompanying drawings illustrate various embodiments of systems, methods, and embodiments of various other aspects of the invention. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

Figure 1:
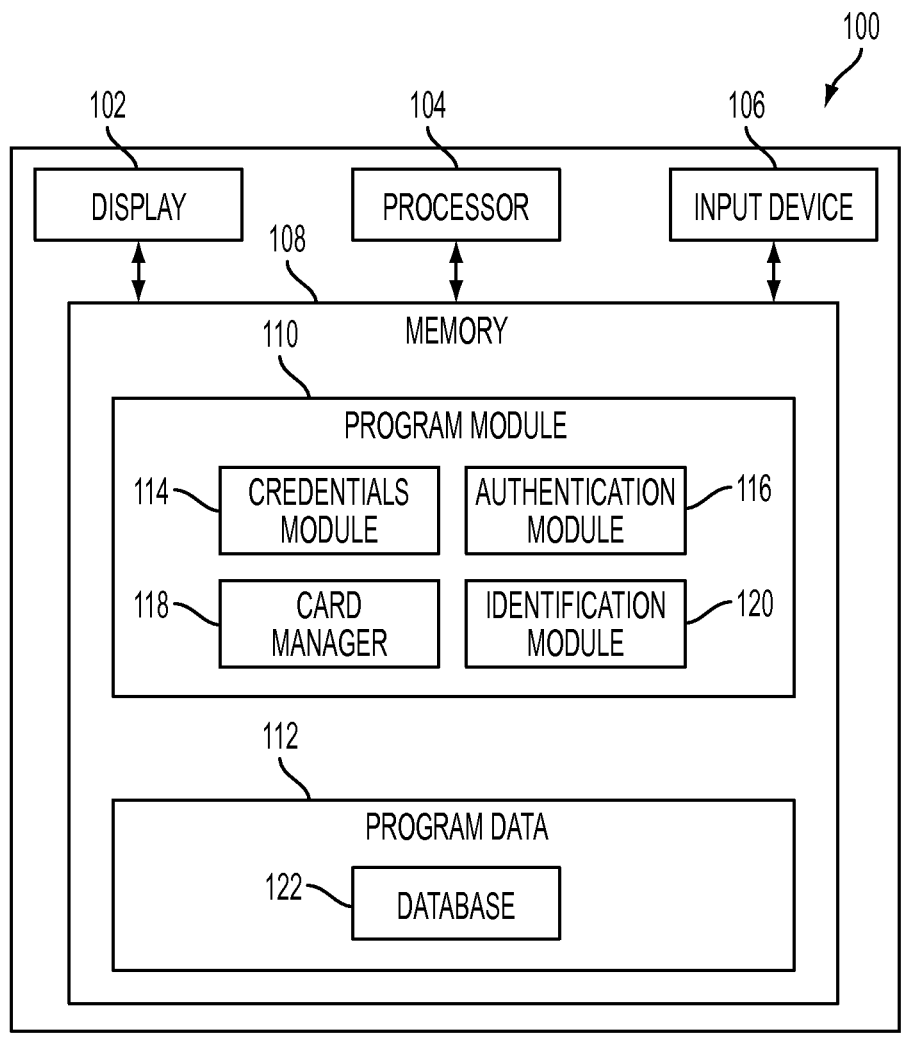
FIG. 1 is a block diagram illustrating various modules of a Multi-Function Device (MFD), in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITION OF TERMS

The following terms shall have, for the purposes of this application, the respective meanings set forth below.

Multi-Function Device: A Multi-Function Device (MFD) corresponds to a device that can perform multiple functions. Examples of the functions include, but are not limited to, printing, scanning, copying, faxing, emailing, and the like. According to this disclosure, the MFD can be a networked MFD or a non-networked MFD.

Memory card: A memory card refers to a device which can be used for storing digital information. In an embodiment, the memory card is a contact memory card, a contactless memory card, a token, and the like. The memory card, as defined in the present disclosure, can also encompass various devices with an in-built memory, such as a smart phone or a tablet.

Swiping: Swiping may be defined as the act of waving a memory card over a card reader/antenna associated with MFD.

Credentials: Credentials may be defined as data associated with a memory card user that could be used for authentication purposes. The memory card user has knowledge of the one or more credentials that are stored in the memory card. Examples of the one or more credentials are a username, a password, a Personal Identification Number (PIN), a domain name, a user display name, an email address, and the like.

Printing: Printing may be defined as a process of making pre-determined data available for printing.

The disclosure can be best understood by referring to the detailed figures and description set forth herein. The embodiments are discussed below with reference to the figures. However, those skilled in the art will readily appreciate that the detailed description given herein with respect to these figures is just for explanatory purposes, as the method and the system extend beyond the described embodiments. For example, those skilled in the art will appreciate, in light of the teachings presented, multiple alternate and suitable approaches, depending on the needs of a particular application, to implement the functionality of any detail described herein, beyond the particular implementation choices in the following embodiments described and shown.

FIG. 1 is a block diagram illustrating various modules of a Multi-Function Device (MFD), in accordance with at least one embodiment. The MFD 100 includes a display 102, a processor 104, an input device 106, and a memory 108. The display 102 is configured to display a user interface at the MFD 100. The processor 104 is configured to execute a set of instructions stored in the memory 108. The input device 106 is configured to receive an input from a memory card user. The memory 108 is configured to store the set of instructions or modules.

The display 102 is configured to display the user interface at the MFD 100. The display 102 can be realized through several known technologies such as, a Cathode Ray Tube (CRT)-based display, a Liquid Crystal Display (LCD), a Light Emitting Diode (LED)-based display and an Organic LED display technology. Further, the display 102 can be a touch screen that can be configured to receive the input from the memory card user.

In an embodiment, the display 102 displays a report indicating successful/unsuccessful authentication processes, a report indicating an invalid PIN, an error report indicating unsuccessful personalization of a memory card, and the like.

The processor 104 is coupled with the display 102, the input device 106, and the memory 108. The processor 104 is configured to execute the set of instructions stored in the memory 108. The processor 104 can be realized through a number of processor technologies known in the art. Examples of the processor 104 can be an X86 processor, a RISC processor, an ASIC processor, a CISC processor, or any other processor. The processor 104 fetches the set of instructions from the memory 108 and executes the set of instructions.

The input device 106 is configured to receive the input from the memory card user. Examples of the input device 106 may include, but are not limited to, a keyboard, a mouse, a joystick, a gamepad, a stylus, or a touch screen. The input device 106 is used to input the one or more credentials in to the MFD 100.

The memory 108 is configured to store the set of instructions or modules. Some of the commonly known memory implementations can be, but are not limited to, a Random Access Memory (RAM), a Read-Only Memory (ROM), a Hard Disk Drive (HDD), and a secure digital (SD) card. The memory 108 includes a program module 110 and a program data 112. The program module 110 includes the set of instructions that can be executed by the processor 104 to perform specific actions on the MFD 100. The program module 110 further includes a credentials module 114, an authentication module 116, a card manager 118, and an identification module 120. The program data 112 includes a database 122.

The credentials module 114 is configured to receive one or more credentials associated with the memory card user. The authentication module 116 is configured to authenticate the one or more credentials. The card manager 118 is configured to reserve a memory segment. The identification module 120 is configured to identify the memory card user based on the one or more credentials written in to the memory segment.

The credentials module 114 is configured to receive the one or more credentials associated with the memory card user. Further, the credentials module stores the one or more credentials associated with the memory card user.

The authentication module 116 is configured to authenticate the one or more credentials.

The card manager 118 is configured to reserve the memory segment, which is vacant in the memory card (e.g., a contactless memory card). In an embodiment, the card manager 118 is configured to write the one or more credentials in to the memory segment. In another embodiment, the card manager 118 is further configured to use a private key to lock or unlock the memory segment. In yet another embodiment, the card manager 118 is configured to use a master key to lock or unlock the memory card. A real-time example of the card manager 118 is a memory card reader/writer.

In an embodiment, the identification module 120 is configured to identify the memory card user based on the one or more credentials written in to the memory segment. In another embodiment, the identification module 120 is configured to extract a workflow data associated with the memory card user. In real time, the memory card reader/writer can perform the operations of the identification module 120.

In an embodiment, the database 122 corresponds to a storage device that stores the workflow data associated with the memory card user. For example, the database 122 can be configured to store the workflow data such as a print job, a scan job, a copy job, a fax job, an email job, and the like. In another embodiment, the database 122 stores the one or more credentials associated with the memory card user. In yet another embodiment, the database 122 is configured to store the private key and the master key. The database 122 can be implemented by using several technologies that are well known to those skilled in the art. Examples of technologies may include, but are not limited to, MySQL®, Microsoft SQL®, and the like. In an embodiment, the database 122 may be implemented as cloud storage. Examples of cloud storage may include, but are not limited to, Amazon E3®, Hadoop® distributed file system, etc. It will be understood and appreciated by a person having ordinary skill in the art that in an alternative embodiment, a server can perform the functions of the database 122.

Figure 2:
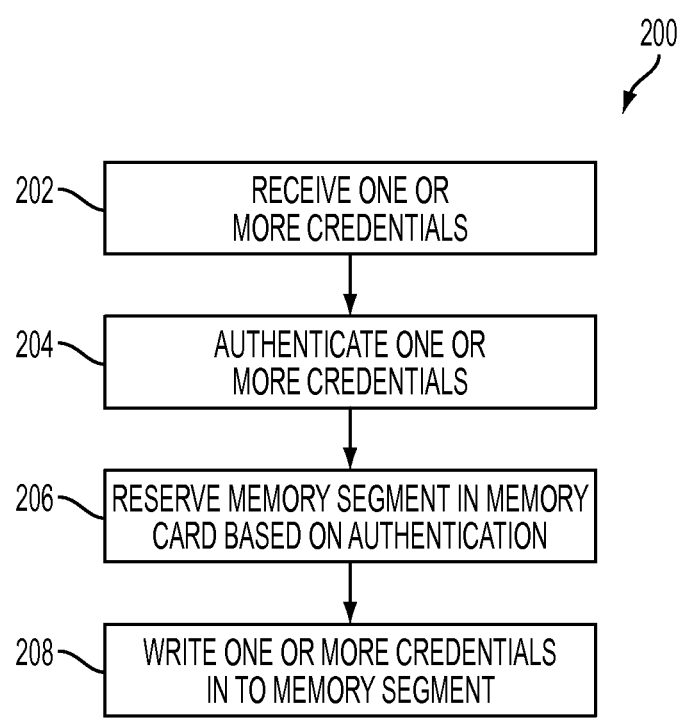
FIG. 2 is a flowchart illustrating a method for personalizing a memory card, in accordance with at least one embodiment.

FIG. 2 is a flowchart illustrating a method for personalizing a card in accordance with at least one embodiment. Explanation of FIG. 2 is in conjunction with FIG. 1.

At step 202, the one or more credentials are received. In an embodiment, the credentials module 114 receives the one or more credentials. The memory card user swipes the memory card in front of the MFD 100. The card manager 118 searches the memory card for the memory segment reserved for a pre-defined application. For example, the card manager 118 searches the memory card for the memory segment reserved for an MFD access, such as the MFD 100. In an embodiment, the MFD 100 can be as that of Xerox®. In such a case, the reserved memory segment carries metadata such as, "Xerox®", which pertains to the MFD 100. In an alternate embodiment, the pre-defined application can correspond to an entry or exit access to an entrance.

In a case where no memory segment reserved for Xerox® is found, the credentials module 114 initiates an auto-enrollment process that is carried out in the MFD 100. According to the auto-enrollment process, the credentials module 114 prompts the memory card user to input the one or more credentials. In an embodiment, the display 102 displays a user interface for inputting the one or more credentials. For example, the memory card user inputs a network username and a network password, which is received by the credentials module 114. The memory card user employs the input device 106 to input the one or more credentials.

In an alternate embodiment, an off-box enrollment process is conducted before the memory card is used at the MFD 100. The off-box enrollment process takes place at a different facility than the MFD 100. According to the off-box enrollment, an operator uses client software to access the memory card to reserve the memory segment. During the off-box enrollment process, the memory card user employs the one or more credentials to personalize the reserved memory segment. The one or more credentials can correspond to the memory card user. The one or more credentials can be provided via prompts, automatically acquired via Lightweight Directory Access Protocol (LDAP), or a combination thereof.

At step 204, the one or more credentials are authenticated. The authentication can be done locally or over a network. The authentication module 116 authenticates the one or more credentials inputted by the memory card user based on an authentication policy. In an embodiment, the authentication policy stored in the authentication module 116 defines an authentication method that is to be performed by the authentication module 116.

According to various embodiments of the disclosure, multiple authentication methods are used to authenticate the memory card user. The multiple authentication methods performed by the authentication module 116 are explained later with reference to the explanation of FIGS. 4-7.

At step 206, a memory segment in memory card is reserved based on the authentication. In an embodiment, the card manager 118 uses the master key to unlock the memory card. The card manager 118 of the MFD 100 has the knowledge of the master key. In an embodiment, once the memory card is unlocked using the master key, the card manager 118 searches for a vacant memory segment to write the one or more credentials.

In an embodiment, the card manager 118 reserves the vacant memory segment based on the authentication. Subsequent to a successful authentication of the one or more credentials inputted by the memory card user, the card manager 118 reserves the memory segment for the MFD 100.

Figure 3:
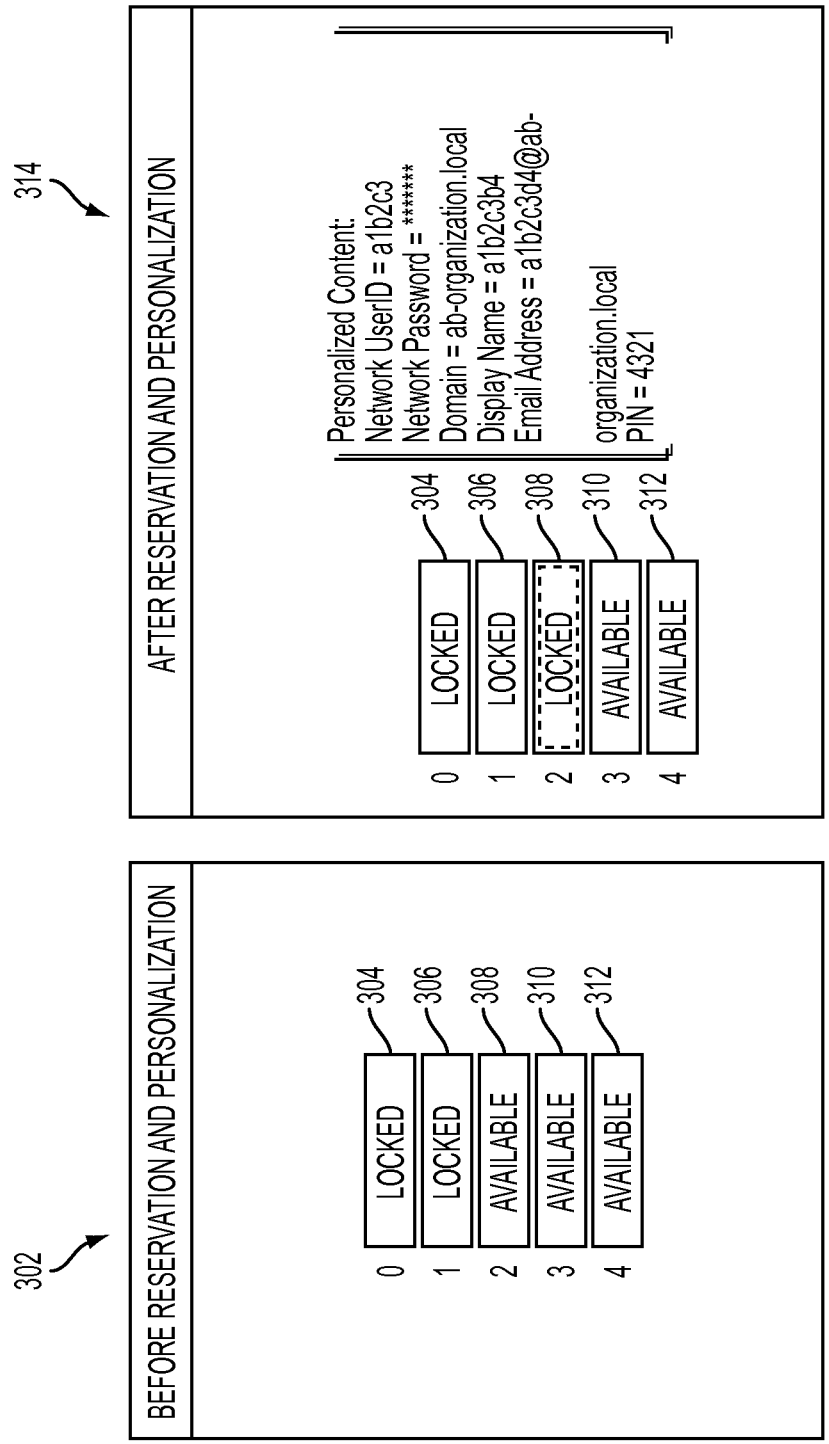
FIG. 3 is a diagram illustrating reservation of a memory segment in a memory card, in accordance with at least one embodiment.

FIG. 3 is a diagram illustrating reservation of a memory segment in a memory card in accordance with at least one embodiment. Explanation of FIG. 3 is in conjunction with FIGS. 1 and 2. According to FIG. 3, a block 302 shows the one or more memory segments, such as a memory segment 304, a memory segment 306, a memory segment 308, a memory segment 310, and a memory segment 312 of the memory card. In an embodiment, the memory segment 304 and the memory segment 306 are locked for use by applications other than the MFD access. The memory segment 308, the memory segment 310, and the memory segment 312 are vacant.

At step 208, the one or more credentials are written into the memory segment. In an embodiment, the card manager 118 chooses the next available memory segment, such as, the memory segment 308 for writing the one or more credentials, if the memory segment 306 is not vacant. Thereafter, the one or more credentials are stored in the memory segment 308 by the card manager 118. A block 314 shows the reservation and personalization of the memory card. The card manager 118 writes the one or more credentials, such as, a network user ID/name, a network password, a domain name, a display name, an email address, Personal Identification Number, and the like into the memory segment 308. Furthermore, the one or more credentials are also stored in the database 122 of the MFD 100.

In an embodiment, subsequent to the writing of the one or more credentials, the card manager 118 locks the memory segment 308 using the private key. Further, the memory card is locked using the master key, thereby completing the personalization of the memory card. The personalization of the memory card, in this case, refers to reserving the memory segment 308 and writing the one or more credentials applicable to the pre-defined application, thereby generating a personalized memory card. A personalized content refers to the one or more credentials written in to the memory segment 308.

In an embodiment, the card manager 118 writes the one or more credentials in to the memory segment 308. Only the one or more credentials necessary for the authentication process are used to authenticate the memory card user. The authentication process used to authenticate the memory card user is defined by the authentication policy, which is adhered to by the MFD 100. The authentication policy specifies the one or more credentials necessary for authenticating a memory card user. For example, the authentication policy specifies that the network username and network password are necessary for authenticating the memory card user. In this case, the network username and the network password are stored in the memory as opposed to the PIN.

In an embodiment, the authentication policy allows an auto-enrollment process of the memory card user at the MFD 100. In such a case, authentication of the memory card user occurs through the auto-enrollment process performed in the MFD 100. According to the auto-enrollment process, the MFD 100 can personalize the memory card with the one or more credentials, when the memory card user employs the memory card for the first time to accesses the MFD 100.

In an alternative embodiment, the authentication policy disallows the auto-enrollment process. In such a case, authentication of the memory card user occurs through the off-box enrollment process described in the preceding description. The private key and a storage algorithm known by the MFD 100 are used during the off-box enrollment process for personalizing the memory card with the one or more credentials. Therefore, when the memory card user swipes the memory card at the MFD 100, the card manager 118 employs the private key and the storage algorithm used during the off-box enrollment process to read the one or more credentials from the memory segment.

The one or more credentials written into the memory segment 308 can be used to perform various authentication processes based on the authentication policy employed by a Company A. The one or more credentials used for authentication can be customized based on the needs of the Company A. For example, Company A may require the authentication process based on the PIN. Company B may require the authentication process based on the content expiration check. Company C may require the authentication process based on both the PIN and the content expiration check.

In an embodiment, an authentication process adopted by a Company D may require only the network username to release a print job. However, the company D may require the network username and the network password to send an email. The various authentication processes are discussed in the latter part of the description. The various authentication processes can be based on a network, a voice, a PIN, a content expiration check, a local device, and a combination thereof.

In an embodiment, after storing the one or more credentials in to the memory segment 308, the time required for the completion of the authentication process is almost instantaneous. This is because the MFD 100 does not have to communicate with any external entity, such as a server. For example, the memory card user swipes the personalized memory card at the MFD 100. The card manager 118 unlocks the memory card using the master key. Further, the card manager 118 searches for the reserved memory segment (such as memory segment 308) associated with the MFD 100. Once the memory segment 308 is found, the card manager 118 uses the secret key to unlock the memory segment 308. Further, the card manager reads the one or more credentials stored at the memory segment 308. The authentication module 116 authenticates the memory card user based on the one or more credentials stored at the memory segment 308. Therefore, the memory card user receives access to the workflow data associated with the memory card user at the MFD 100.

Figure 4:
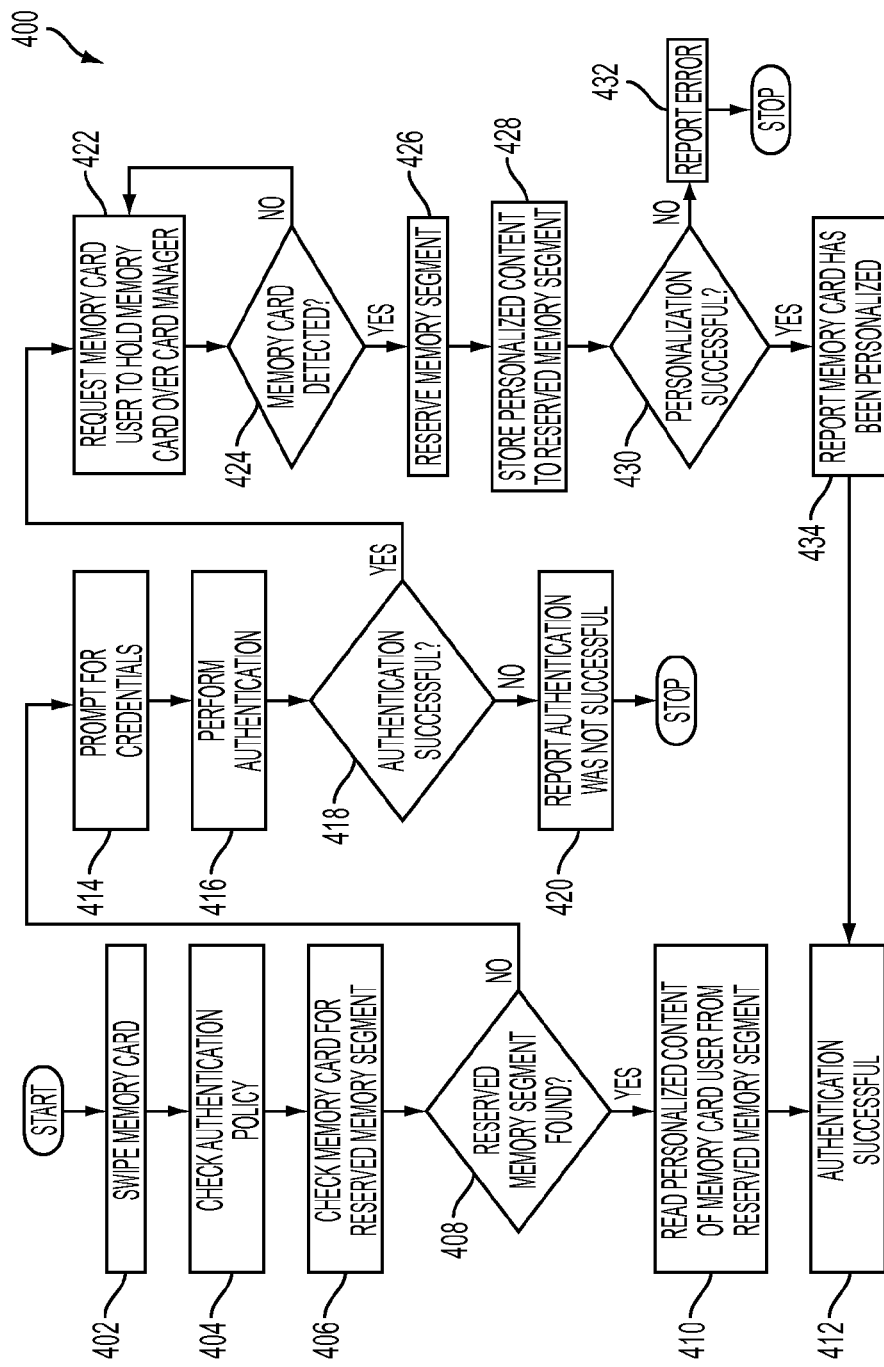
FIG. 4 is a flowchart illustrating an authentication process with auto enrollment, in accordance with at least one embodiment.

FIG. 4 is a flowchart illustrating an authentication process with auto-enrollment, in accordance with at least one embodiment. Explanation of FIG. 4 is in conjunction with FIG. 1.

At step 402, the memory card is swiped. In an embodiment, the memory card user swipes the memory card at the MFD 100.

At step 404, the authentication policy is checked. In an embodiment, the authentication module 116 stores the authentication policy. The authentication policy specifies the type of enrollment process that is allowed when the memory card is swiped at the MFD 100 for the first time. The various types of enrollment process can be the auto-enrollment process and the off-box enrollment process. The authentication module 116 checks the authentication policy and determines the type of enrollment that is to be performed.

In an embodiment, the authentication policy enables the auto-enrollment process. During the auto-enrollment process, the memory card is checked for a reserved memory segment (such as the memory segment 308) at step 406. The card manager 118 checks for the reserved memory segment associated with the MFD 100 at step 406. If discovery of the reserved memory segment occurs at step 418, the card manager 118 reads the personalized content of the memory card user from the memory segment 308 as indicated in step 410. Further, the authentication module 116 authenticates the memory card user based on the personalized content. In case the authentication is successful, a report is displayed on the display 102 indicating successful authentication, as in step 412.

In another embodiment, when the card manager 118 does not find the reserved memory segment at step 408, the credentials module 114 prompts the memory card user for the one or more credentials, at step 414. The memory card user employs the input device 106 to input the one or more credentials prompted by the credentials module 114. At step 416, the authentication module 116 performs network authentication or local authentication based on the authentication policy. At step 418, the authentication module 116 checks for a successful authentication.

In case the authentication is not successful, the authentication module 116 sends a report to be displayed at the display 102 to the memory card user. The report indicates that the authentication was not successful, as indicated in step 420.

In an alternate case, where the authentication is successful, at step 422, a message is displayed at the display 102 that instructs the memory card user to hold the memory card over the card manager 118 associated with the MFD 100.

At step 424, the card manager 118 checks for a proper detection of the memory card. In case the memory card is detected, the memory segment (such as the memory segment 308) is reserved as indicated in step 426. In an embodiment, the memory card is reserved for a particular application (such as for accessing the MFD 100 owned by a specific customer). In such a case, a unique private key can be personalized for the specific customer such that the one or more Multi-Function Devices (such as MFD 100) owned by the specific customer use the unique private key for locking/unlocking the reserved memory segment in order to gain access to the one or more Multi-Function Devices.

Subsequent to the step 426, the one or more credentials inputted by the memory card user at step 512 are stored in the memory segment 308, as indicated in step 428. In step 430, the memory card is checked for a successful personalization. In an embodiment, when the personalization of the memory card is not successful, an error report is displayed on the display 102 to the memory card user, as indicated in step 432. In an alternate embodiment, when the personalization is successful, a report is displayed on the display 102 indicating successful personalization as in step 434.

Figure 5:
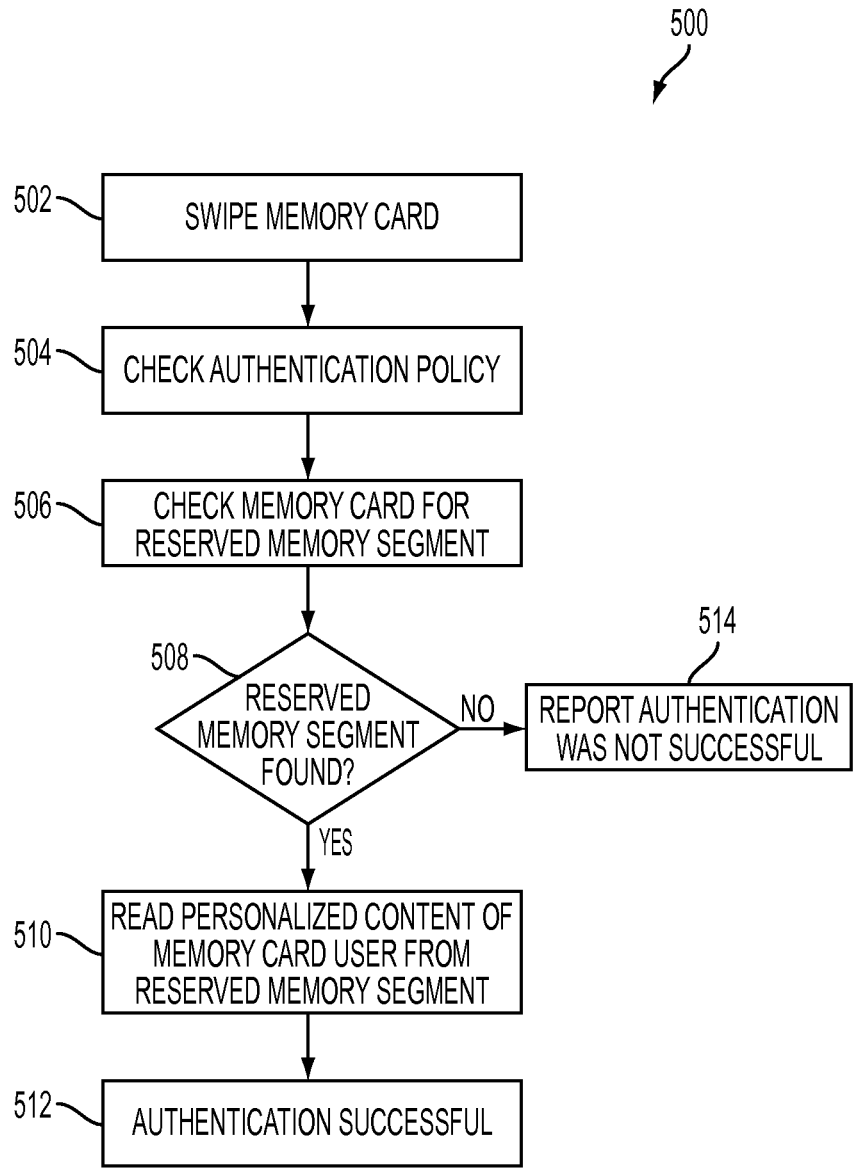
FIG. 5 is a flowchart illustrating an authentication process without auto enrollment, in accordance with at least one embodiment.

In an embodiment, the authentication policy stored at the authentication module 116 disallows auto-enrollment at the MFD 100. In such a case, the memory card user is not allowed to auto-enroll at the MFD 100 by inputting the one or more credentials manually. Therefore, only the off-box enrollment process can personalize the memory card. FIG. 5 is a flowchart illustrating the authentication process without auto enrollment, in accordance with at least one embodiment. Explanation of FIG. 5 is in conjunction with FIG. 4. Steps 502, 504, 506, 508, 510, and 512 are similar to steps 402, 404, 406, 408, 410, and 412 (refer to FIG. 4), respectively. At the step 508, in case the reserved memory segment (such as memory segment 308) is not found, a report appears on the display 102 that states unsuccessful authentication, as in step 514.

Figure 6:
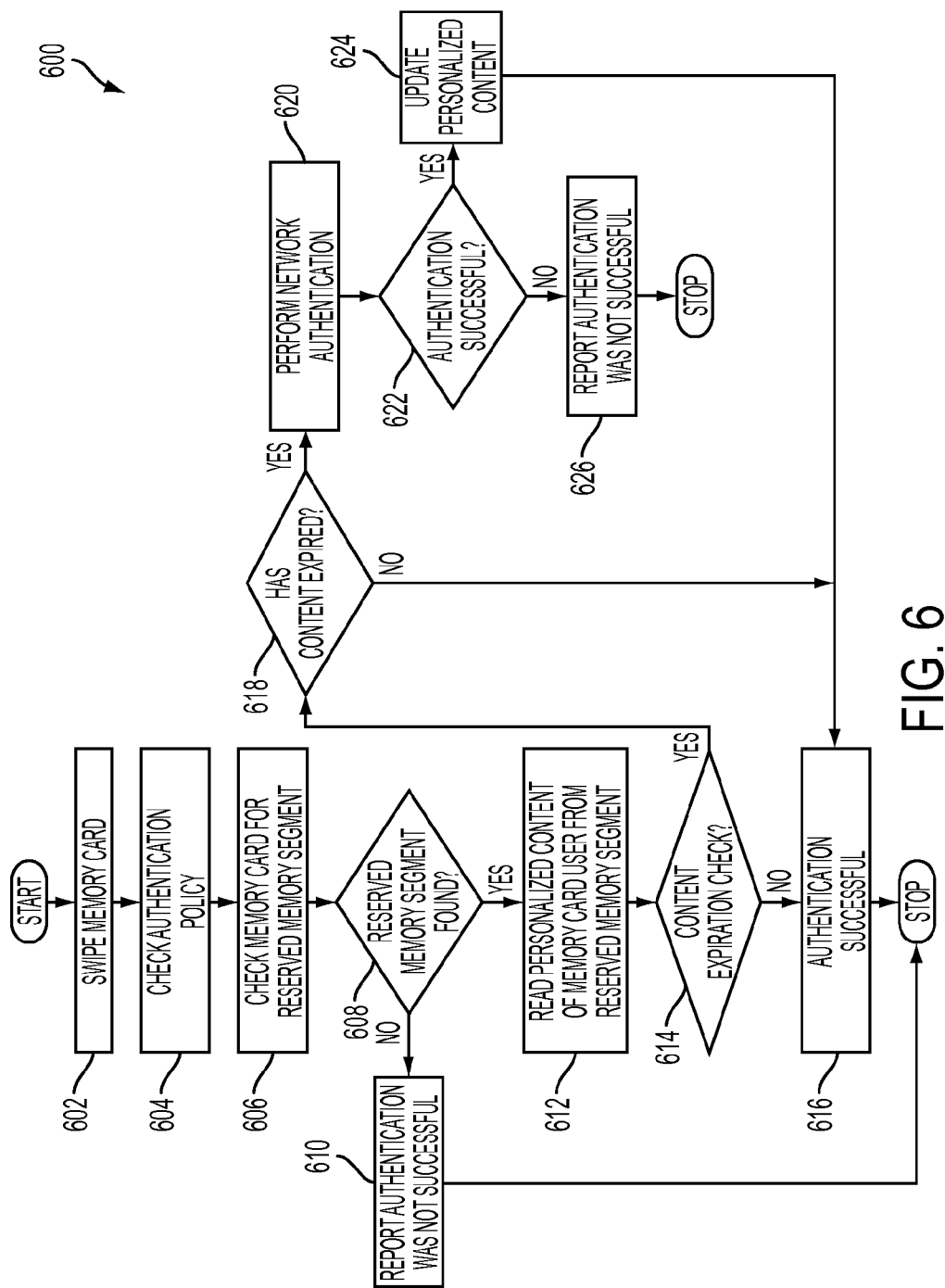
FIG. 6 is a flowchart illustrating an authentication process with a content expiration check, in accordance with at least one embodiment.

In an embodiment, the authentication policy stored at the authentication module 116 enables content expiration check as a criterion for authentication. FIG. 6 is a flowchart illustrating an authentication process with a content expiration check, in accordance with at least one embodiment. Explanation of FIG. 6 is in conjunction with FIG. 4. Steps 602, 604, 606, and 608 are similar to steps 402, 404, 406, and 408 (refer to FIG. 4), respectively. At step 608, when the card manager 118 does not find a reserved memory segment (such as memory segment 308), a report is displayed on the display 102 that indicates unsuccessful authentication as in step 610.

In an embodiment, when the card manager 118 finds the reserved memory segment (such as memory segment 308) at step 608, the personalized content of the memory card user is read from the reserved memory segment. The card manager 118 reads the personalized content from the reserved memory segment at step 612. Further, at step 614, the authentication module 116 checks the authentication policy to determine if the content expiration check is allowed in the authentication policy. In case the authentication policy disallows the content expiration check, authentication occurs based on the one or more credentials stored in the memory segment 308. Further, a report appears on the display 102 indicating successful authentication, as in step 616.

In an embodiment, the authentication policy stored at the authentication module 116, allows the content expiration check to be performed at the time of authentication at the MFD 100. In such a case, content expiration check of the personalized content occurs at step 614. The content expiration check corresponds to a date and/or time until which the personalized content (such as the network password) of a memory cardholder, stored at the reserved memory segment, is valid. In an embodiment, the content expiration check is performed via network authentication with a specified time period. The network password associated with the memory card user must be updated within the specified time period (e.g., 60 days), in case the authentication policy allows the content expiration check.

In an embodiment, the authentication module 116 checks for an expiry date of the network password associated with the memory card user at step 618. In case the network password had not expired, a report appears on the display 102 indicating successful authentication, as in step 616.

In an embodiment, when the network password of the memory card user has expired, network authentication is conducted at step 620. The network authentication checks for a match in the network username and the network password stored in the reserved memory segment and the database 122. In case of a match, the authentication is successful, at step 622. Subsequently, the network password is updated at step 624. The memory card user via the input device 106 updates the network password. In an alternative case, when the authentication is not successful at step 622, a report representative of an unsuccessful authentication appears on the display 102, as indicated in step 626.

Figure 7:
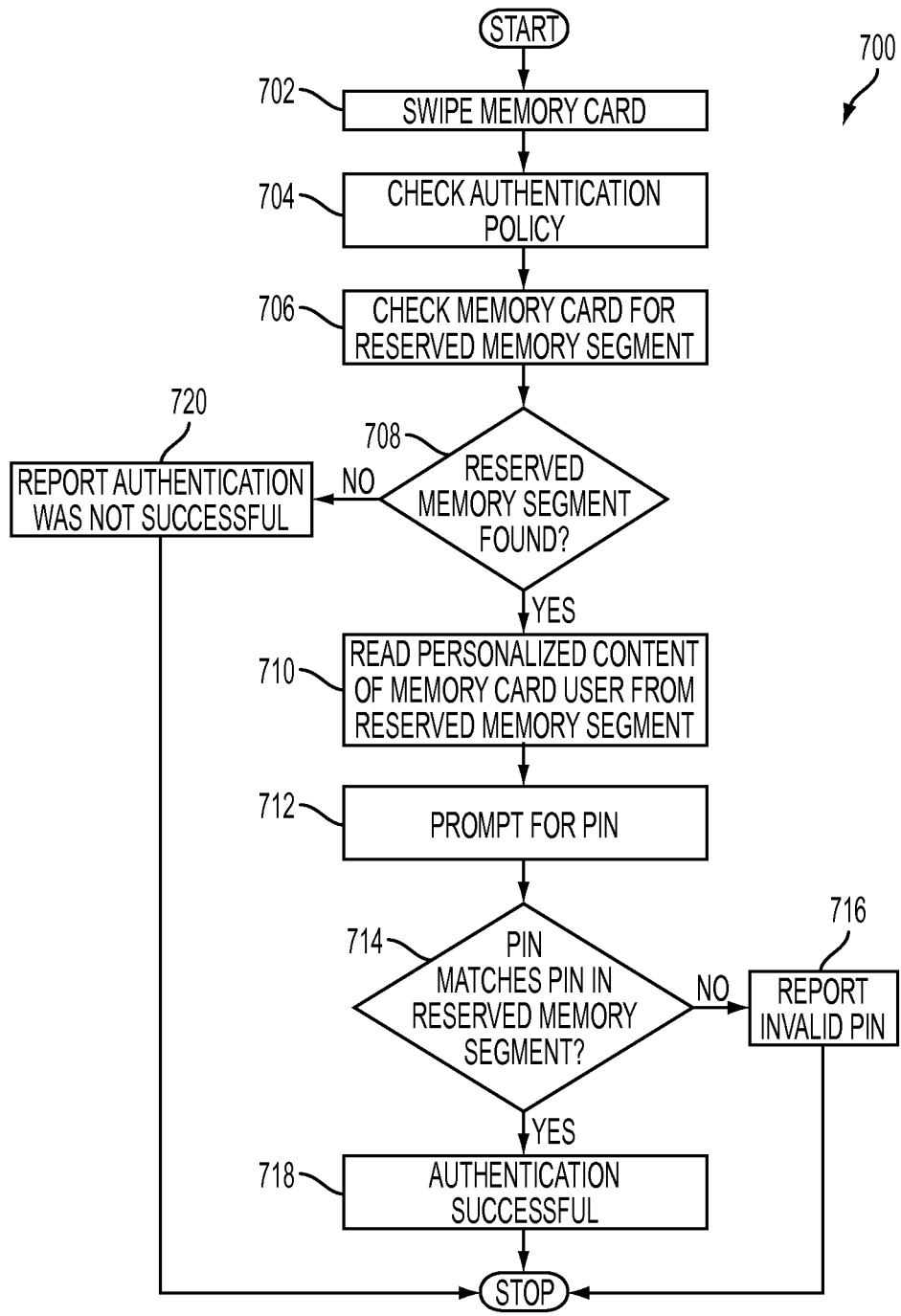
FIG. 7 is a flowchart illustrating an authentication process involving Personal Identification Number (PIN), in accordance with at least one embodiment.

Yet another authentication process involves the PIN. FIG. 7 is a flowchart illustrating an authentication process involving a Personal Identification Number (PIN) in accordance with at least one embodiment. Explanation of FIG. 7 is in conjunction with FIG. 4.

Steps 702, 704, 706, 708, and 710 are similar to steps 402, 404, 406, 408, and 410. In an embodiment, once the personalized content of the memory card user is read from the memory segment 308 at step 710, the memory card user is prompted for a PIN at the display 102. The memory card user employs the input device 106 to input the PIN. The authentication module 116 checks for a match in the PIN inputted by the memory card user and the PIN stored in the memory segment 308, at step 714. In case of a mismatch, a report appears on the display 102 representing an invalid PIN, as in step 716. In case of a match, a report appears on the display 102 representing successful authentication, as in step 718.

In an embodiment, when the card manager 118 does not find the reserved memory segment, a report is displayed on the display 102 representing unsuccessful authentication, as indicated in step 720.

In an embodiment, the card manager 118 uses a trial-and-error method to determine a vacancy of a memory segment. According to this method, the card manager 118 tries to unlock the one or more memory segments associated with the memory card using the private key stored at database 122. In an embodiment, the card manager 118 tries to unlock the one or more memory segments until a memory segment is successfully unlocked. In another embodiment, the card manager 118 tries to unlock the one or more memory segments until the card manager 118 finds a memory segment that is not locked. In yet another embodiment, the card manager 118 tries to unlock the one or more memory segments until attempts have been made to unlock all the one or more memory segments.

In an embodiment, storing the one or more credentials in the reserved memory segment aids in future workflows that require the one or more credentials of the memory card user. An example of such workflow is scan-to-home directory.

Further, in an embodiment the one or more credentials written in to the memory segment 308 is used to perform local authentication at the MFD 100. Since, the MFD 100 has the one or more credentials of one or more memory card users stored locally in the database 122, the total time required for authentication is minimized.

In an alternate embodiment, the one or more credentials written into the memory segment 308 are used to perform network authentication. Since the one or more credentials are written in to the memory segment 308, the involvement of the memory card user is minimized. Subsequently, total time required for authentication is further minimized.

The disclosed embodiments provide a secure workflow for user authentication, which does not require additional infrastructure, administration, licenses, and/or maintenance. This is because the MFD 100 or any other office equipment device acts as a card management station that has the capability to read and write directly to the memory card.

Further, the usage of the MFD 100 as the card management station for reading and writing on to the memory card allows the MFD 100 to provide customizable workflows that could be unique to each customer. An example of such customizable workflow is to prompt the memory card user for PIN and use the PIN as a key to unlock the memory segment rather than using a private key shared by one or more Multi-Function Devices (such as the MFD 100) to unlock the memory segment. In an embodiment, security can be further enhanced by performing permutation on the master key and the private key in customizable ways.

Further, the disclosed embodiments provide improved productivity by storing the one or more credentials (such as a network name, a network password, a PIN, an email id, and the like) required for authentication on the memory card. In an embodiment, storing the one or more credentials in the memory card removes the need to authenticate against any other remote services, such as Windows Active Directory®. In an alternative embodiment, storing the one or more credentials in the memory card removes the need for third party solutions that develop memory card based solutions, such as Equitrac, SafeCom, YSoft, and the like.

Therefore, the disclosed embodiments increase the productivity of the workflow due to the reduction in time spent on the authentication process (approximately 1 second for the completion of authentication process).

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

While various embodiments have been illustrated and described, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for personalizing a memory card, the method comprising:
    in a multi-function device (MFD) suitable for providing access to a workflow data, wherein the workflow data comprises at least a print job, a scan job, a copy job, a fax job, and an email job:
        receiving a first user input from the memory card, wherein the memory card includes one or more memory segments;
        searching for at least one memory segment from the one or more memory segments associated with the MFD based on the first user input;
        prompting the memory card user for one or more credentials when the search does not find a memory segment associated with the MFD;
        receiving, through an input device in the MFD, a second user input comprising one or more credentials directly from a memory card user, wherein the second user input is different from the first user input;
        authenticating the one or more credentials;
        associating a vacant memory segment from the one or more memory segments in the memory card to the MFD, based on the authentication and the received one or more credentials; and
        writing the one or more credentials on to the associated memory segment.

2. The method of claim 1 further comprising identifying the memory card user based on the one or more credentials written on to the at least one memory segment based on the searching.

3. The method of claim 1 further comprising locking or unlocking the memory segment in the memory card using a private key.

4. The method of claim 1 further comprising locking or unlocking the memory card using a master key.

5. The method of claim 1, wherein the authentication is based on an authentication policy.

6. The method of claim 5, wherein the authentication policy comprises authentication based on at least one of a network, a voice, a PIN (Personal Identification Number), a content expiration check, a local device, or a combination thereof.

7. The method of claim 1, wherein the one or more memory segments are reserved for a pre-defined application.

8. The method of claim 7, wherein the pre-defined application comprises an entry or exit access to an entrance.

9. The method of claim 1, wherein the one or more credentials comprises at least one of a username, a password, a Personal Identification Number (PIN), a domain name, a user display name, an email address, or a combination thereof.

10. The method of claim 1, wherein the reserved memory segment is used to store the one or more credentials associated with the memory card user.

11. A multi-function device (MFD) suitable for providing access to a workflow data, wherein the workflow data comprises at least a print job, a scan job, a copy job, a fax job, an email job, the MFD comprising:
    a processor operable to:

receive a first user input from the memory card, wherein the memory card includes one or more memory segments;

search for at least one memory segment from the one or more memory segments associated with the MFD based on the first user input;

prompt the memory card user for one or more credentials when the search does not find a memory segment associated with the MFD;

receive, through an input device in the MFD, a second user input comprising one or more credentials directly from a memory card user, wherein the second user input is different from the first user input;

authenticate the one or more received credentials; and associate a vacant memory segment from the one or more memory segments in the memory card to the MFD based on the authentication and the received one or more credentials; and write the one or more credentials on to the associated memory segment.

12. The MFD of claim 11, wherein the processor is further operable to lock or unlock the memory segment in the memory card using a private key.

13. The MFD of claim 11, wherein the processor is further operable to identify the memory card user based on the one or more credentials written on to the at least one memory segment based on the searching.

14. The MFD of claim 11, wherein the processor locks or unlocks the memory card using a master key.

15. The MFD of claim 11, wherein the processor is further operable to extract a workflow data associated with a memory card user from a server.

16. The MFD of claim 11 is at least one of a networked MFD or a non-networked MFD.

17. A computer program product for use with a computer, the computer program product comprising non-transitory computer usable medium having a computer readable program code embodied therein for personalizing a memory card, the computer readable program code comprising:

program instruction means for receiving a first user input from the memory card, wherein the memory card includes one or more memory segments;

program instruction means for searching for at least one memory segment from the one or more memory segments associated with the MFD based on the first user input;

program instruction means for prompting the memory card user for one or more credentials when the search does not find a memory segment associated with the MFD;

program instruction means for receiving, through an input device in the MFD, a second user input comprising one or more credentials directly from a memory card user, wherein the second user input is different from the first user input;

program instruction means for authenticating the one or more credentials;

program instruction means for associating a vacant memory segment from the one or more memory segments in the memory card for the computer based on the authentication and the received one or more credentials; and program instruction means for writing the one or more credentials on to the associated memory segment.

18. The computer program product of claim 17 further comprising program instruction means for locking or unlocking the memory segment in the memory card using a private key.

19. The computer program product of claim 17 further comprising program instruction means for identifying the memory card user based on the one or more credentials written in to the memory segment.

20. The method of claim 1, wherein the one or more credentials, written to the reserved memory segment by the MFD, are utilizable by the MFD to access the workflow data when the memory card is read by the MFD.

21. The method of claim 1, wherein associating a vacant memory segment from the one or more memory segments in the memory card to the MFD further comprises:

retrieving a private key from a database; and determining, using trial-and error, a vacant memory segment from the one or more memory segments by attempting to unlock each of the one or more memory segments with the retrieved private key.

22. The MFD of claim 11, wherein associating a vacant memory segment from the one or more memory segments in the memory card to the MFD further comprises:

retrieving a private key from a database; and determining, using trial-and error, a vacant memory segment from the one or more memory segments by attempting to unlock each of the one or more memory segments with the retrieved private key.

23. The computer program product of claim 17, wherein associating a vacant memory segment from the one or more memory segments in the memory card to the MFD further comprises:

retrieving a private key from a database; and determining, using trial-and error, a vacant memory segment from the one or more memory segments by attempting to unlock each of the one or more memory segments with the retrieved private key.

* * * * *